Figure 1:
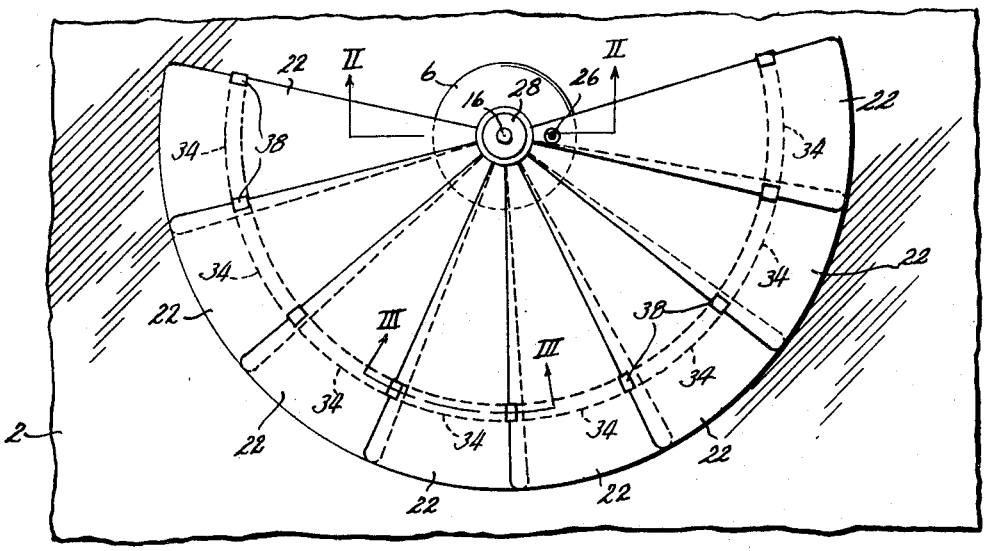

United States Patent
Zip

[15] 3,649,069
[45] Mar. 14, 1972

[54] GLARE SHIELD FOR AUTOMOBILES

[72] Inventor: Andrew H. Zip, 1103 South 23rd St., St. Joseph, Mo. 64507

[22] Filed: June 3, 1970

[21] Appl. No.: 43,137

[52] U.S. Cl. ...................296/97 D, 160/134, 160/DIG. 12, 248/206 R, 296/97 G
[51] Int. Cl. ...........................................................B60j 3/02
[58] Field of Search............296/97 R, 97 D, 97 G; 160/134, 160/DIG. 12; 248/206 R

[56] References Cited

UNITED STATES PATENTS

| 1,450,142 | 3/1923 | Dietrich | 160/134 X |
| 1,613,364 | 1/1937 | Thompson | 160/134 X |
| 3,075,070 | 1/1963 | Lipsitz | 160/134 X |

FOREIGN PATENTS OR APPLICATIONS

| 325,000 | 2/1930 | Great Britain | 296/97 D |
| 457,330 | 3/1950 | Italy | 296/97 D |
| 634,739 | 2/1962 | Italy | 296/97 D |
| 178,934 | 4/1962 | Sweden | 296/97 D |

*Primary Examiner*—Benjamin Hersh
*Assistant Examiner*—John A. Pekar
*Attorney*—John A. Hamilton

[57] ABSTRACT

A glare shield for automobiles consisting of a spindle having a suction cup at one end thereof for mounting it on an automobile windshield or window glass at right angles to the glass surface, a series of segmentally shaped planar vanes pivoted on said spindle for movement from an angularly aligned, overlapping position to an angularly spread, fan-like position, a mechanism frictionally resisting pivotal movement of said vanes, and devices operable to pivot said vanes, adjust said friction mechanism and release said suction cup, all of said devices being operable by a motorist from a single position of his hand.

2 Claims, 4 Drawing Figures

Patented March 14, 1972

3,649,069

INVENTOR.
Andrew H. Ziph
BY John A. Hamilton
Attorney.

GLARE SHIELD FOR AUTOMOBILES

This invention relates to new and useful improvements in automobile accessories, and has particular reference to a glare shield adapted for use in automobiles.

The problem created by bright, glaring lights in connection with safe driving is of course well known, whether said glaring lights constitute the sun itself, either direct or reflected from the automobile hood, or the headlights of approaching vehicles. The usual automobile sun visor which merely obstructs the upper portion of the windshield, is at best only a partial solution to the problem. Such visors, for example, often do not extend low enough to shield the driver's eyes from the sun, and offer no protection whatsoever against sunlight reflected upwardly from the hood surface forwardly of the windshield, or against sunlight entering the side windows of the vehicle, or against the glare of approaching headlights.

Accordingly, the principal object of the present invention is the provision of a glare shield which solves all of these problems in a simple, economical and convenient manner. Generally, this object is accomplished by the provision of a planar shield, which may be either opaque or transparent but tinted, which may be freely moved about and attached to any desired portion of the windshield, windows or other smooth surface of the vehicle, as may be dictated by the source and direction of glare, and which may be freely adjusted as to the extent of its area.

Another object is the provision of a glare shield of the character described wherein all of the controls, including the means for attaching or detaching the shield and adjusting the area thereof are so grouped and unified that the motorist may operate all of them easily and conveniently with one hand, and with no necessity of diverting his eyes from the roadway.

Other objects are simplicity and economy of construction, and efficiency and dependability of operation.

Figure 2:
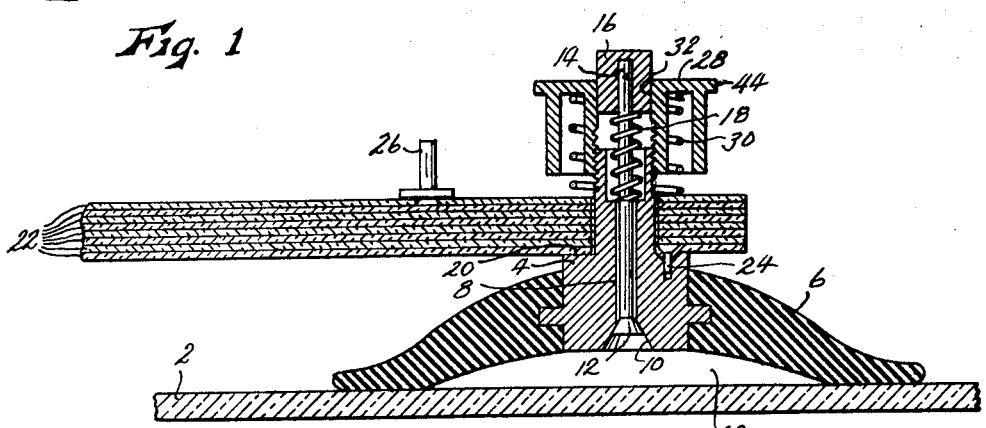
Figure 3:
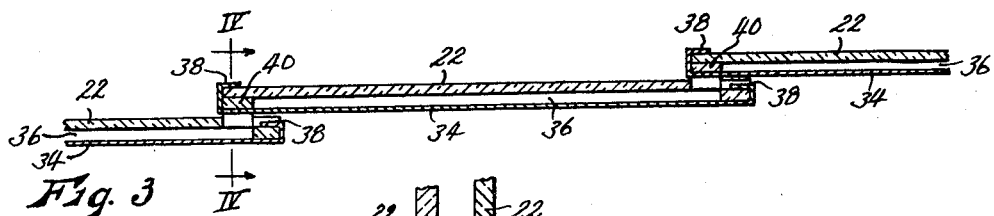
Figure 4:
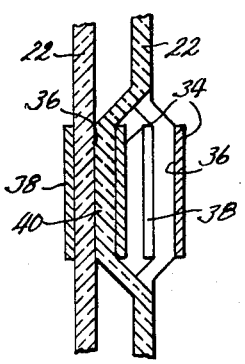

With these objects in view, as well as other objects which will appear in the course of the specification, reference will be had to the accompanying drawing, wherein:

FIG. 1 is a fragmentary elevational view of the interior surface of an automobile windshield, showing a glare shield embodying the present invention applied operatively thereto, said shield being extended to its maximum area, FIG. 2 is a fragmentary, enlarged sectional view taken on line II—II of FIG. 1, with the vanes of the shield folded into angularly aligned relation, FIG. 3 is an enlarged, fragmentary sectional view taken on line III—III of FIG. 1, and FIG. 4 is an enlarged, fragmentary sectional view taken on line IV—IV of FIG. 3.

Like reference numerals apply to similar parts throughout the several views, and the numeral 2 applies to an automobile windshield to which the glare shield forming the subject matter of the present invention is to be attached, although it will be understood that the shield may also be attached to a side window of the vehicle, or to any other smooth surface thereof.

The glare shield includes a tubular spindle 4 having one end thereof securely molded centrally in a rubber suction cup 6, coaxially therewith and extending outwardly therefrom. The bore 8 of said spindle opens through both ends thereof, and communicates with the interior of cup 6, the inner end of said bore forming a conical valve seat 10 in which is disposed a correspondingly conical valve plug 12 affixed to a valve stem 14 which extends outwardly through bore 8 beyond the outer end of the spindle. A pushbutton 16 is affixed to the extended end of said stem, and a helical compression spring 18 is disposed about said stem, bearing at one end against pushbutton 16 and at its opposite end against the spindle, whereby to urge valve plug 12 into airtight sealing engagement with valve seat 10. Pressure on pushbutton 16 will compress spring 18 to open valve 12, for a purpose which will presently appear.

Just outwardly of cup 6, spindle 4 is externally reduced in diameter to form an outwardly facing annular shoulder 20 thereon. A series of planar, segmentally shaped vanes 22 are assembled in stacked relation on the reduced portion of the spindle, so that the innermost vane rests against shoulder 20. Said vanes extend radially from spindle 4, and are all rotatable about said spindle as an axis with the exception of said innermost vane, which is secured nonrotatably to shoulder 20 by means of a pin 24 extending therethrough and into said shoulder. The outermost vane has a pin 26 fixed therein in offset relation from the spindle, and extending outwardly therefrom parallel to said spindle. The vanes may be formed of sheet metal, in which case they would of course be opaque, but preferably are formed of a transparent but tinted material, such as thin sheet plastic, as shown.

Spindle 4 extends outwardly from the outermost vane 22, and has a cap 28 threaded on the extended end thereof. Said cap encloses a helical compression spring 30 bearing at one end against said cap and at its opposite end against outermost vane 22 whereby to urge the stack of vanes yieldably against shoulder 20. Cup 28 is tubular, having a bore 32 formed therein to accommodate valve stem 14 and pushbutton 16 of valve 12. Said pushbutton extends slightly outwardly from the face of cap 28, and is axially slidable in bore 32.

Valves 22 may be turned by their rotation on spindle 4 either to an angularly aligned coextensive relation with the fixed innermost vane, or be angularly spread to form a fan-shaped shield as shown in FIG. 1, or of course to any intermediate position. When spread as in FIG. 1, angularly opposite edges of successive vanes, are disposed in overlapping relation, whereby the vanes present a continuous fanlike shield, the maximum angular extent of which is determined by the angular extent of each vane and the number of vanes used. These are of course matters of choice.

There are means provided, as best shown in FIGS. 3 and 4, for preventing successive vanes from ever moving out of overlapping relation, which would of course interrupt the continuity of the shield, and for permitting rotary adjustment of all the vanes by manipulation of one vane. Considering the surfaces of the vanes facing suction cup 6 as their forward faces, this means includes an arcuate strip 34 disposed closely adjacent and parallel to the forward surface of each vane, whereby to form a narrow opening 36 therebetween. Said strip is disposed concentrically to spindle 4, and is affixed to its associated vane by having its end portions 38 bent to overlap the rearward face of the vane at its respectively opposite sides, and secured thereto. Each vane has a narrow strip 40 thereof, adjacent the leading edge thereof as the vanes are spread in a counter-clockwise direction, as viewed in FIG. 1, or to the right as viewed in FIG. 3, offset rearwardly and engaged slidably in the narrow opening 36 formed by strip 34 of the next rearward vane. Thus, successive vanes can never move into angularly separated relation, but can be moved from a position in which they are coextensive to a position in which their angularly opposite edges are disposed in only slightly overlapping relation, as in FIG. 3. Furthermore, by grasping only pin 26 of the rearmost vane and moving it around the spindle whereby said rearmost vane is turned, said rearmost vane pivots all of the remaining vanes to maintain the continuity of the shield.

In use, the glare shield is affixed to windshield 2, or to a side window or to any other smooth surface of the vehicle, at any desired position, by pressing suction cup 6 firmly against said surface, deforming said cup to drive air outwardly between the surface and the edges of the cup lip. The cup lips then engage in sealing contact with the smooth surface, so that when pressure on the cup is released and it tends to recover resiliently to enlarge the cavity 42 therebetween, a retaining vacuum forms in said cavity to hold the shield in place, with spindle 4 disposed normally to the windshield or other surface. The affixing pressure to the cup is applied by manual pressure on cap 28, while taking care not to depress pushbutton 16. The cap is sufficiently larger in diameter than the pushbutton that pressure can easily be applied to the peripheral edge portion of the cap without engaging the pushbutton.

The shield is preferably applied, as just described, with vanes 22 pivoted to an angularly aligned position, as in FIG. 2. This permits easier handling thereof by the motorist, who may often be performing the operation while actually driving, and should not remove his eyes from the roadway, and also permits the driver easily to index, merely by his sense of touch, the position of the edge of the shield "fan" which will be fixed after the shield is attached, that is, the position of the vane 22 which lies directly against and is fixed to shoulder 20 of the spindle. Then he engages pin 26, which he may do easily with the thumb of the hand he has used to press the suction cup into engagement with the windshield, without necessity of taking his eyes from the road to locate said pin, and pivots said pin around cap 28 to extend vanes 22 to form a shield of the desired angular extent. Pin 26, which acts as a handle, is of course affixed only to the outermost of the vanes, but controls all of them so long as they are connected by strips 34 as described, and the motorist need not adjust the vanes individually or even necessarily touch them at all.

Spring 30 loads the inner ends of the vanes, with a sufficient force to hold them firmly at any angular position to which they may be moved, while still permitting adjustment thereof when desired. If the load is in any case so great as to prevent easy adjustment, or so small as to fall to hold the vanes where set, it may be adjusted by rotating cap 28 in one direction or the other to decrease or increase the tension of said spring.

The shield may be detached from the windshield very easily by depressing pushbutton 16, whereby to open valve 12 to admit air into the interior cavity 42 of the suction cup. Cap 28 is provided with a peripheral flange 44, in order that it may conveniently be grasped between the first two fingers of one hand, while depressing pushbutton 16 with the thumb of the same hand. The fit of valve stem 14 in spindle bore 8, and the fit of pushbutton 16 in cap bore 32, is sufficiently loose to permit free flow of air therearound.

Thus it will be apparent that a glare shield having several advantages has been produced. It may be moved about with great flexibility and freedom to provide glare protection whenever needed, in both day and night driving. It may be adjusted widely as to its area extent, in order to provide the desired protection without unduly obstructing vision. If formed of transparent, tinted material, it provides glare protection without obstructing vision. If the source of glare is not directly in the line of normal driving vision, it can be adjusted to provide glare protection without being disposed in the line of vision at all. Since all of the controls necessary for its mounting and adjustment, including the controls for applying or releasing the suction cup, pivotally adjusting the vanes, and adjusting the friction loading thereof, are conveniently grouped at and adjacent cap 28, the motorist may conveniently and safely mount and demount, change the location of, and adjust the shield while actually driving, using only one hand and with no necessity of taking his eyes from the roadway.

The shield, for convenience and ease of handling, is necessarily somewhat limited in area, even when the vanes thereof are fully extended, but this is not considered to be a disadvantage since nearly all sources of glare to which a driver is subjected are of very limited area or scope, and since the shield is freely movable from place to place. The collapsibility of the shield to the area of a single vane, if desired, permits it to be installed in areas which are small or of difficult access. The segmental shape of the shield is advantageous in fitting the shield into specific areas. For example, suction cup 6 may be attached at the extreme corner of a windshield or window, and the shield then expanded angularly to whatever extent may be necessary to fill said corner.

While I have shown and described a specific embodiment of my invention, it will be readily apparent that many minor changes of structure and operation could be made without departing from the spirit of the invention.

What I claim as new and desire to protect by Letters Patent is:

1. An automobile glare shield comprising:
   a. a tubular spindle,
   b. means for attaching one end of said spindle to an automobile windshield or the like, comprising a suction cup formed of resilient material, said spindle being affixed at one end in said suction cup, generally coaxial therewith and extending outwardly therefrom, said tubular spindle providing an air passage from the exterior to the interior of said suction cup,
   c. a valve operable to seal said passage,
   d. means biasing said valve yieldably toward its closed position
   e. manually operable means for opening said valve,
   f. a series of generally planar segmentally shaped vanes each pivoted at one end on said spindle and extending generally radially therefrom, and
   g. means carried by said spindle and yieldably resisting rotary pivoting of said vanes thereon.

2. An automobile glare shield as recited in claim 1, wherein said spindle has an outwardly facing shoulder formed thereon; wherein said vanes are assembled in stacked relation on said spindle against said shoulder; wherein said means for resisting rotation of said vanes on said spindle comprises a tubular cap threaded on the end of said spindle opposite said suction cup, and a compression spring interposed between said cap and the outermost vane of said stack of vanes, whereby the tension of said spring may be adjusted by turning said cap; and with the addition of:
   a. means securing the vane engaging said shoulder against rotation relative to said spindle,
   b. means securing each vane of said series to each adjacent vane of the series whereby adjacent vanes are limited to relative pivotal movement from an angularly aligned, coextensive relation to a position in which they are only slightly overlapped, and
   c. a handle secured to the vane farthest from said shoulder, adjacent said cap said manually operable means for opening said valve including a pushbutton disposed slidably in the tubular bore of said cup and projecting outwardly from said cap.

* * * * *